April 7, 1953 A. W. FRIEND 2,634,380

CATHODE-RAY TUBE

Filed Nov. 17, 1950

INVENTOR
Albert W. Friend
BY
[signature]
ATTORNEY

Patented Apr. 7, 1953 2,634,380

UNITED STATES PATENT OFFICE 2,634,380

CATHODE-RAY TUBE

Albert W. Friend, Princeton, N. J., assignor to Radio Corporation of America, a corporation of Delaware Application November 17, 1950, Serial No. 196,125

3 Claims. (Cl. 313—76)

This invention relates to cathode ray tubes and more particularly to a cathode ray tube which is adapted to reproduce images in either black and white or natural color.

It has been proposed to produce color images by employing a single cathode ray tube having a multi-element fluorescent screen that produces different colors depending upon the direction of approach of the scanning beam of electrons. In such devices circuit arrangements are provided to change the direction of approach at a frequency determined by the rate of change in the color information represented by the video signals.

One such arrangement is disclosed in the copending United States application of Russell R. Law, Serial No. 165,552, filed June 1, 1950, and assigned to the assignee of the present invention. The system therein described utilizes a specially formed diaphragm inserted in the beam path to interrupt the beam whenever it would approach the screen at such an angle as to reproduce more than one color at a time.

Such devices will faithfully reproduce color images from a color video signal and will reproduce black and white images from standard black and white video signals. It is an object of this invention to provide a cathode ray tube of the type described which will reproduce images in either black and white or in color.

It is a further object of the invention to provide a cathode ray tube which will be stable in operation and which will reproduce black and white images without color shading.

Briefly, in accordance with the invention a diaphragm is placed in the path of the cathode ray beam and which is provided with annular slots, one for each color phosphor, so that the beam is allowed to pass the diaphragm only when it is at a proper angle to strike a single color phosphor. In addition a center hole is provided so that when receiving black and white signals the beam passes straight through and strikes all phosphors simultaneously to produce white light.

Figure 1:
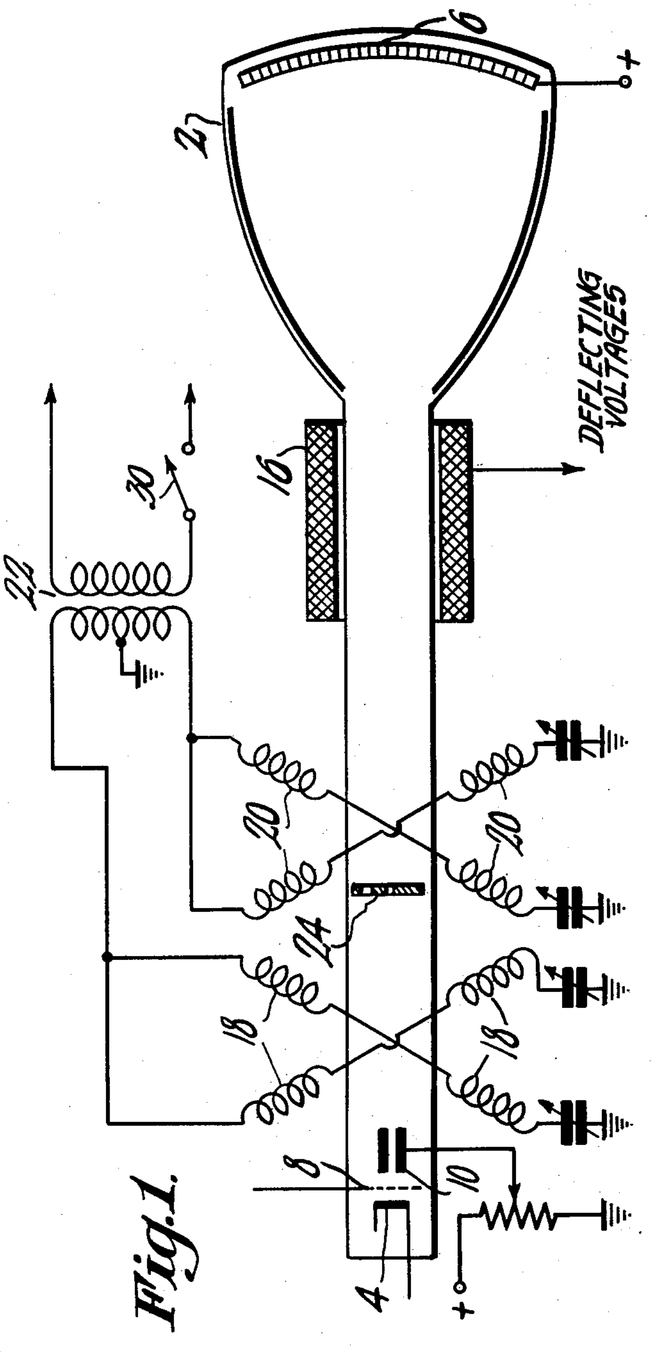
Figure 2:
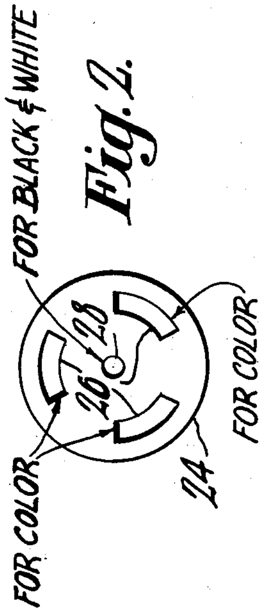

The above and other objects and advantages of the invention will become apparent upon a consideration of the following detailed description taken in conjunction with the accompanying drawings in which:

Fig. 1 represents diagrammatically the details of a cathode ray tube constructed in accordance with the invention together with the associated deflection circuits, and Fig. 2 is a plan view of a diaphragm for the tube constructed in accordance with the invention.

Referring now to Fig. 1 it will be seen that the tube consists of an evacuated glass envelope 2 having mounted therein an electron gun structure 4 adapted to project a stream of electrons toward a multi-element screen 6. The screen may be of any suitable type wherein a plurality of phosphors are arranged over incremental areas so that the particular phosphor energized depends upon the angle at which the stream of electrons strikes the target. It will be understood that the invention is equally applicable to any of the screens of this type and is therefore shown only diagrammatically. The screen is connected to a suitable source of high positive voltage not shown. The intensity of the beam is controlled by the grid 8 as is customary and there is provided the usual focusing electrode 10. There is also provided the usual deflecting coils 16 to cause the beam to be accurately focused on the screen and to scan the screen in a manner well known to those skilled in the art. It will be clear that the invention is not limited to the particular type of beam bending arrangement shown. Thus the second beam bending coil 20 may be replaced by a magnetic lens which causes the beam to converge at the proper angle. Furthermore, the beam may be rotated by electrostatic rather than electromagnetic means.

To reproduce color it is necessary to cause the beam to strike the target at varying angles as the target is being scanned. This is accomplished by providing two sets of coils 18 and 20. These coils are energized by means of potentials applied to them through a transformer 22. Since the coil side of the transformer has its center tap grounded the voltages applied to the sets of coils are always 180° out of phase with each other. Thus, the beam is first bent outwardly and then inwardly in a radial plane by the successive rotating magnetic fields. In this way, the direction of approach of the beam to the screen is continuously changed, although the angle of approach is substantially constant.

By means of the diaphragm 24 the beam, as it is rotated, is interrupted at intervals during which there would be a possibility of energizing more than a single phosphor. This operation will be clear from a consideration of Fig. 2. It will be seen that the diaphragm 24 is provided with annular slots 26 which have their radial centers spaced so as to be swept by the rotating cathode ray beam. One such slot is provided for each color phosphor. As the beam rotates as described above, the passage of the beam to the target will be blocked by the solid portions of the diaphragm between the annular slots.

The solid portions are oriented in the tube so as to blank the beam as its path changes from one phosphor to the next.

For the reception of black and white signals the potentials applied to the transformer 22 during color reception are removed as by the opening of switch 30 and hence the rotation of the beam does not take place and the beam travels in a substantially straight line from the gun structure to the defining aperture. This straight line path is permitted by means of the central opening 23 in the diaphragm. After passing the defining aperture the beam is deflected and scans the target in the normal manner. However, since it has not been rotated it will approach the phosphors at an angle such as to strike all of the phosphors of each group and energize those in each incremental area equally to produce white light. Since the phosphors of each incremental area are equally activated and their activation occurs simultaneously the possibility of color shading due to undesired changes in signal strength between sequential activation of the phosphors is prevented.

What is claimed is:

1. In a color television receiver, a cathode ray tube having means for producing a beam of electrons, a diaphragm in the path of said beam having annular slots and a central opening therein, and a multi-element screen of groups of different color elements, means for bending said beam in a rotating plane so as to cause said beam to scan said slots whereby the different color elements of said screen are activated sequentially and means adapted to disable said bending means whereby said beam passes through said central opening and activates groups of said different color elements simultaneously.

2. A color television image reproducing device comprising in combination, a cathode ray tube, said cathode ray tube having a target which produces an image as a result of electronic bombardment by electrons of a scanning beam, and wherein said target is particularly characterized in that the color of said image is dependent upon the direction of approach of said scanning beam to said target, a diaphragm having annularly spaced openings and a central opening therein, said diaphragm positioned in the path of said beam, means to selectively direct said beam through said annularly spaced openings in a manner to produce a different color light on said target for each opening, and wherein said diaphragm is also positioned in a manner that the beam when passing through the central opening in said diaphragm produces a substantially white light at said target.

3. The invention as set forth in claim 2 and wherein the white light produced by said beam when passing through said central opening in said diaphragm results from the beam intercepting a plurality of the different color elements.

ALBERT W. FRIEND.

REFERENCES CITED

The following references are of record in the file of this patent:

UNITED STATES PATENTS

| Number | Name | Date |
|---|---|---|
| 2,173,193 | Zworykin | Sept. 19, 1939 |
| 2,452,157 | Sears | Oct. 26, 1948 |
| 2,462,896 | Ransom | Mar. 1, 1949 |
| 2,464,419 | Smith et al. | Mar. 15, 1949 |
| 2,465,380 | Labin et al. | Mar. 29, 1949 |

FOREIGN PATENTS

| Number | Country | Date |
|---|---|---|
| 866,065 | France | Mar. 31, 1941 |